US012358226B2

(12) United States Patent
Meron et al.

(10) Patent No.: US 12,358,226 B2
(45) Date of Patent: Jul. 15, 2025

(54) SERVICE STATION FOR A THREE-DIMENSIONAL PRINTING SYSTEM

(71) Applicant: Stratasys Ltd., Rehovot (IL)

(72) Inventors: Mordechay Meron, Herzliya (IL); Hanan Azran, Ashdod (IL); Barak Glassman, Ness Ziona (IL); Shmuel Rubin, Moshav Tkuma (IL); Guy Menchik, RaAnana (IL)

(73) Assignee: Stratasys Ltd., Rehovot (IL)

( * ) Notice: Subject to any disclaimer, the term of this patent is extended or adjusted under 35 U.S.C. 154(b) by 191 days.

(21) Appl. No.: 17/921,393

(22) PCT Filed: Apr. 27, 2021

(86) PCT No.: PCT/IL2021/050490
§ 371 (c)(1),
(2) Date: Oct. 26, 2022

(87) PCT Pub. No.: WO2021/220277
PCT Pub. Date: Nov. 4, 2021

(65) Prior Publication Data
US 2023/0088152 A1 Mar. 23, 2023

Related U.S. Application Data

(60) Provisional application No. 63/015,741, filed on Apr. 27, 2020.

(51) Int. Cl.
*B29C 64/35* (2017.01)
*B29C 64/106* (2017.01)
(Continued)

(52) U.S. Cl.
CPC ............ *B29C 64/35* (2017.08); *B29C 64/106* (2017.08); *B29C 64/209* (2017.08); *B33Y 40/20* (2020.01); *B33Y 10/00* (2014.12); *B33Y 30/00* (2014.12)

(58) Field of Classification Search
CPC .................. B41J 2/16526; B41J 2/16517; B41J 2/16538; B41J 2/16544; B33Y 50/02;
(Continued)

(56) References Cited

U.S. PATENT DOCUMENTS 6,259,962 B1   7/2001  Gothait
6,569,373 B2   5/2003  Napadensky
(Continued)

FOREIGN PATENT DOCUMENTS

CN   108943721   12/2018
EP     3398783   11/2018
(Continued)

OTHER PUBLICATIONS

International Preliminary Report on Patentability Dated Nov. 10, 2022 From the International Bureau of WIPO Re. Application No. PCT/IL2021/050490. (17 Pages).

(Continued)

*Primary Examiner* — Monica A Huson

(57) ABSTRACT

A service station system for a three-dimensional printing system comprises: a bath, having a fast-release connector at a front side thereof, and a hinge at a back side thereof for hingebly connecting an open top of the bath to a surface of the three-dimensional printing system; and a wiper assembly, having a wiper device detachably connected to a wiper base mounted on a rotatable axis passing through the bath. The wiper device wipes a dispensing face of the printing head of the three-dimensional printing system while the head reciprocally moves above the bath between the back side and the front side. The service station system can also comprise a motor for rotating the axis.

19 Claims, 16 Drawing Sheets

(51) Int. Cl.
 *B29C 64/209* (2017.01)
 *B33Y 40/20* (2020.01)
 *B33Y 10/00* (2015.01)
 *B33Y 30/00* (2015.01)

(58) Field of Classification Search
 CPC ......... B33Y 40/00; B33Y 40/20; B33Y 10/00;
 B33Y 30/00; B29C 64/118; B29C 64/209;
 B29C 64/393; B29C 64/165; B29C
 64/112; B29C 64/106; B29C 64/241;
 B29C 64/35; B22F 12/37; B22F 10/22;
 B22F 12/53; Y02P 10/25
 See application file for complete search history.

(56) References Cited

U.S. PATENT DOCUMENTS

| | | | |
|---|---|---|---|
| 6,658,314 | B1 | 12/2003 | Gothait |
| 6,850,334 | B1 | 2/2005 | Gothait |
| 7,183,335 | B2 | 2/2007 | Napadensky |
| 7,209,797 | B2 | 4/2007 | Kritchman et al. |
| 7,225,045 | B2 | 5/2007 | Gothait et al. |
| 7,300,619 | B2 | 11/2007 | Napadensky et al. |
| 7,479,510 | B2 | 1/2009 | Napadensky et al. |
| 7,500,846 | B2 | 3/2009 | Eshed et al. |
| 7,962,237 | B2 | 6/2011 | Kritchman |
| 8,784,723 | B2 | 7/2014 | Napadensky |
| 9,031,680 | B2 | 5/2015 | Napadensky |
| 10,611,136 | B2 | 4/2020 | Menchik et al. |
| 2013/0000553 | A1 | 1/2013 | Hoechsmann et al. |
| 2016/0039207 | A1 | 2/2016 | Kritchman et al. |

FOREIGN PATENT DOCUMENTS

| | | |
|---|---|---|
| JP | 2008-513252 | 5/2008 |
| JP | 2016-107631 | 6/2016 |
| JP | 2017-105143 | 6/2017 |
| JP | 2019-162761 | 9/2019 |
| WO | WO 2021/220277 | 11/2021 |

OTHER PUBLICATIONS

International Search Report and the Written Opinion Dated Aug. 31, 2021 From the International Searching Authority Re. Application No. PCT/IL2021/050490. (25 Pages).

Invitation to Pay Additional Fees, Communication Relating to the Result of the Partial International Search and the Provisional Opinion Dated Jul. 9, 2021 From the International Searching Authority Re. Application No. PCT/IL2021/050490. (15 Pages).

Communication Pursuant to Article 94(3) EPC Dated Jul. 12, 2024 From the European Patent Office Re. Application No. 21726209.6. (5 Pages).

Notice of Reason(s) for Rejection Dated Jan. 21, 2025 From the Japan Patent Office Re. Application No. 2022-563105 together with the Translation in English. (8 pages).

SERVICE STATION FOR A THREE-DIMENSIONAL PRINTING SYSTEM

RELATED APPLICATIONS

This application is a National Phase of PCT Patent Application No. PCT/IL2021/050490 having International Filing date of Apr. 27, 2021, which claims the benefit of priority under 35 USC § 119 (e) of U.S. Provisional Patent Application No. 63/015,741 filed on Apr. 27, 2020. The contents of the above applications are all incorporated by reference as if fully set forth herein in their entirety.

FIELD AND BACKGROUND OF THE INVENTION

The present invention, in some embodiments thereof, relates to three-dimensional printing and, more particularly, but not exclusively, to a service station for a three-dimensional printing system.

Additive manufacturing (AM) is a technology enabling fabrication of arbitrarily shaped structures directly from computer data via additive formation steps. The basic operation of any AM system consists of slicing a three-dimensional computer model into thin cross sections, translating the result into two-dimensional position data and feeding the data to control equipment which fabricates a three-dimensional structure in a layerwise manner.

Additive manufacturing entails many different approaches to the method of fabrication, including three-dimensional (3D) printing such as 3D inkjet printing. 3D inkjet printing is performed by a layer by layer inkjet deposition of building materials. Thus, a building material is dispensed from a dispensing head having a set of nozzles to deposit layers on a supporting structure. The layers are then leveled by a leveling device, and cured or solidified.

Various three-dimensional printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,479,510, 7,500,846, 7,962,237, 8,784,723, 9,031,680 and 10,611,136, all of the same Assignee, the contents of which are hereby incorporated by reference.

SUMMARY OF THE INVENTION

According to an aspect of some embodiments of the present invention there is provided a service station system for a three-dimensional printing system. The printing system has at least one printing head. The service station system comprises: a bath, having a fast-release connector at a front side thereof, and a hinge at a back side thereof for hingebly connecting an open top of the bath to a surface of the three-dimensional printing system. The service station system can also comprise a wiper assembly, having a wiper device detachably connected to a wiper base mounted on a rotatable axis passing through the bath. The wiper device is optionally and preferably configured to wipe a dispensing face of the printing head while the head reciprocally moves above the bath between the back side and the front side. The service station system can comprise a motor for rotating the axis.

According to some embodiments of the invention the wiper assembly comprises a shaft, wherein the wiper base is mounted on the rotatable axis by the shaft, and wherein the shaft is rotatable, independently from, and perpendicularly to, a rotation of the axis by the motor.

According to an aspect of some embodiments of the present invention there is provided a service station system for a three-dimensional printing system. The printing system has at least one printing head. The service station system comprises: a bath, having a front side, a back side and an open top face; and a wiper assembly, having a wiper device, and a wiper base that is detachably connected to the wiper device and that is mounted by a shaft to a rotatable axis passing through the bath. The wiper device is configured to wipe a dispensing face of the printing head while the head reciprocally moves above the bath between the back side and the front side; and a motor for rotating the axis.

According to some embodiments of the invention the shaft is tilted with respect to a horizontal direction.

According to some embodiments of the invention the wiper assembly comprises a shield structure for shielding a connection between the shaft and the axis from liquid building material wiped by the wiper device or purged by the printing head.

According to some embodiments of the invention the service station system comprises a liquid trap covering the top and having a plurality of perforated liquid guiding grooves for collecting liquid building material wiped by the wiper device or purged by the printing head.

According to an aspect of some embodiments of the present invention there is provided a service station system for a three-dimensional printing system having at least one printing head. The service station system comprises: a bath, having a front side, a back side and an open top face; a wiper assembly, having a wiper device configured to wipe a dispensing face of the printing head while the head reciprocally moves above the bath between the back side and the front side; and a liquid trap covering the top and having a plurality of perforated liquid guiding grooves for collecting liquid building material wiped by the wiper device or purged by the printing head.

According to some embodiments of the invention a number of the groves is equal to a number of building material channels of the at least one printing head.

According to some embodiments of the invention the grooves are perforated at a plurality of locations along their length, except for locations at a vicinity of the wiper assembly.

According to some embodiments of the invention the wiper device is oriented generally perpendicular to an indexing direction of the three-dimensional printing system.

According to some embodiments of the invention a width of the wiper device is at least the width of all printing heads of the three-dimensional printing system.

According to some embodiments of the invention the wiper device is oriented parallel to an indexing direction of the three-dimensional printing system.

According to some embodiments of the invention a width of the wiper device is at least the length of the printing head.

According to some embodiments of the invention the wiper device comprises an elastomeric wiping element having wiping end that is substantially straight and continuous throughout its width.

According to some embodiments of the invention the wiper device comprises an elastomeric wiping element characterized by a Shore A hardness of from about 70 to about 90.

According to some embodiments of the invention the elastomeric wiping element comprises a synthetic rubber.

According to some embodiments of the invention the synthetic rubber comprises ethylene propylene diene.

According to some embodiments of the invention the wiper device comprises an elastomeric wiping element connected to an elastic non-polymeric planar structure.

According to some embodiments of the invention the elastic non-polymeric planar structure is metallic.

According to some embodiments of the invention the fast-release connector comprises a latch assembly.

According to some embodiments of the invention the latch assembly comprises a bent elastic wire shaped to support the bath from below.

According to an aspect of some embodiments of the present invention there is provided a printing system for three-dimensional printing, comprises: at least one printing head for dispensing building materials; and the service station system as delineated above and optionally and preferably as further detailed below.

According to some embodiments of the invention the printing system comprises a computerized controller configured for controlling the at least one printing head to periodically visit the service station system, for wiping of the dispensing face and/or purging building material into the bath.

According to an aspect of some embodiments of the present invention there is provided a printing system for three-dimensional printing. The printing system comprises: at least one printing head for dispensing building materials; a service station system, having a motor; a backlight source; and a computerized controller configured for controlling the printing head and the service station system. The service station system optionally and preferably comprises: (a) a bath, having a front side and a back side; (b) a wiper assembly, having a wiper device detachably connected to a wiper base mounted on a rotatable axis passing through the bath, the wiper device being configured to wipe a dispensing face of the printing head while the head reciprocally moves between the back side and the front side; and (c) a motor for rotating the axis. The backlight source is preferably positioned behind the bath such that when the wiper device is disengaged from the dispensing face, light from the backlight source passes between the wiper device and the dispensing face, and when the wiper device engages the dispensing face, the light from the backlight source is blocked by the wiper device.

According to some embodiments of the invention the computerized controller is configured for automatically activating the backlight source when the motor rotates the axis.

According to an aspect of some embodiments of the present invention there is provided a method of printing a three-dimensional object. The method comprises: receiving three-dimensional printing data corresponding to the shape of the object; feeding the data to the printing system as delineated above and optionally and preferably further detailed below; and periodically moving the at least one printing head to visit the service station system, for wiping of the dispensing face and/or purging building material into the bath.

According to an aspect of some embodiments of the present invention there is provided a method of aligning a wiper device of a three-dimensional printing system having at least one printing head and the wiper device. The method comprises: moving the printing head to a location above the wiper device, illuminating the printing head and the wiper device from behind, such that light passes therebetween; and decreasing a vertical distance between the wiper device and the printing head until the wiper device blocks the light.

According to some embodiments of the invention the wiper device comprises an elastomeric wiping element, and the method comprises, when the wiper device blocks the light, increasing the vertical distance by a predetermined amount so as to reduce a stress applied by the printing head on the elastomeric wiping element.

According to an aspect of some embodiments of the present invention there is provided a method of performing maintenance on a three-dimensional printing system. The three-dimensional printing system comprises the service station system as delineated above and optionally and preferably as further detailed below. The method comprises: releasing the fast-release connector so as to hingebly rotate the front side of the bath downward, and reveal the wiper base; detaching the wiper device from the wiper base; and detachably connecting a replacement wiper device to the wiper base.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
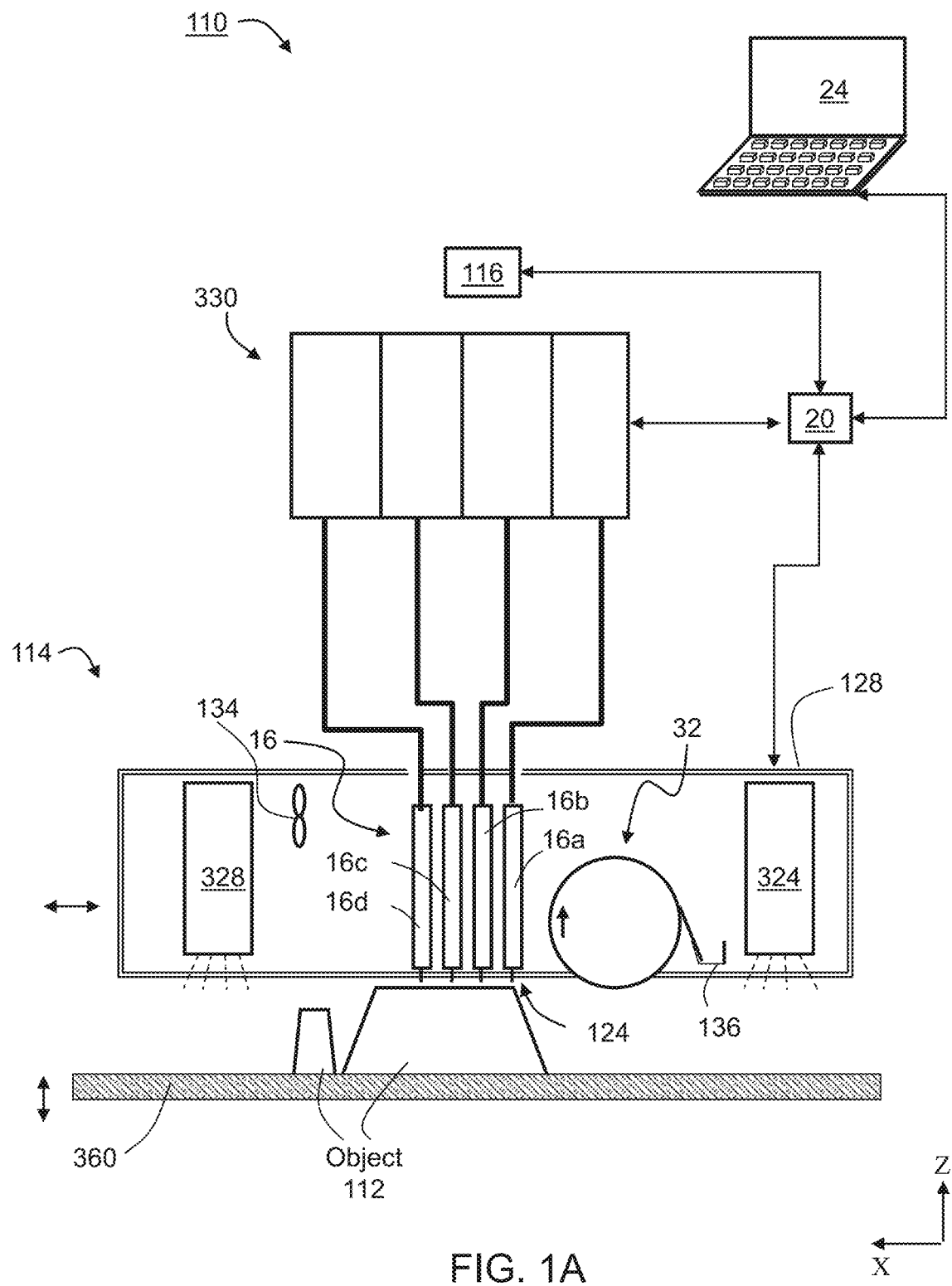
FIGS. 1A-D are schematic illustrations of an additive manufacturing system according to some embodiments of the invention.

The present invention, in some embodiments thereof, relates to three-dimensional printing and, more particularly, but not exclusively, to a service station for a three-dimensional printing system.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, an OBJ File format (OBJ), a 3D Manufacturing Format (3MF), Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof.

Each layer is formed by an additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material, and which type of building material is to be delivered thereto. The decision is made according to a computer image of the surface.

In preferred embodiments of the present invention the AM comprises three-dimensional printing, more preferably three-dimensional inkjet printing. In these embodiments a building material is dispensed from a printing head having one or more arrays of nozzles to deposit building material in layers on a supporting structure. The AM apparatus thus dispenses building material in target locations which are to be occupied and leaves other target locations void. The apparatus typically includes a plurality of arrays of nozzles, each of which can be configured to dispense a different building material. This is typically achieved by providing the printing head with a plurality of fluid channels are separated from each other such that there is no fluid communication therebetween, wherein each channel receives a different building material through a separate inlet and conveys it to a different array of nozzles.

Thus, different target locations can be occupied by different building materials. The types of building materials can be categorized into two major categories: modeling material and support material. The support material serves as a supporting matrix or construction for supporting the object or object parts during the fabrication process and/or other purposes, e.g., providing hollow or porous objects. Support constructions may additionally include modeling material elements, e.g. for further support strength.

The modeling material is generally a composition which is formulated for use in additive manufacturing and which is able to form a three-dimensional object on its own, i.e., without having to be mixed or combined with any other substance.

The final three-dimensional object is made of the modeling material or a combination of modeling materials or modeling and support materials or modification thereof (e.g., following curing). All these operations are well-known to those skilled in the art of solid freeform fabrication.

In some exemplary embodiments of the invention an object is manufactured by dispensing two or more different modeling materials, each material from a different array of nozzles (belonging to the same or different printing heads) of the AM apparatus. In some embodiments, two or more such arrays of nozzles that dispense different modeling materials are both located in the same printing head of the AM apparatus. In some embodiments, arrays of nozzles that dispense different modeling materials are located in separate printing heads, for example, a first array of nozzles dispensing a first modeling material is located in a first printing head, and a second array of nozzles dispensing a second modeling material is located in a second printing head.

In some embodiments, an array of nozzles that dispense a modeling material and an array of nozzles that dispense a support material are both located in the same printing head. In some embodiments, an array of nozzles that dispense a modeling material and an array of nozzles that dispense a support material are both located in separate the same printing head.

Figure 2A:
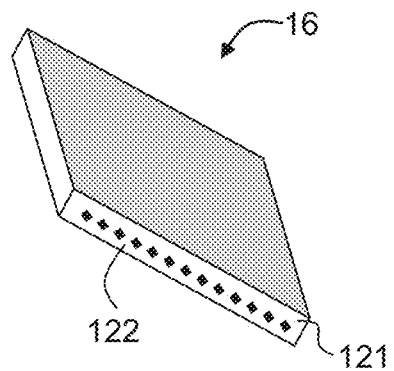
FIGS. 2A-2C are schematic illustrations of printing heads according to some embodiments of the present invention.
Figure 2B:
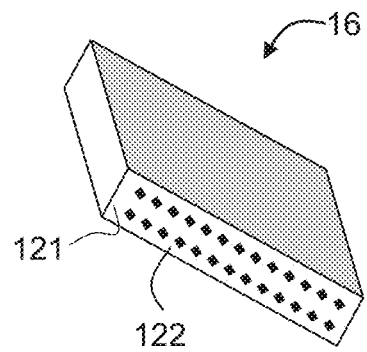
Figure 2C:
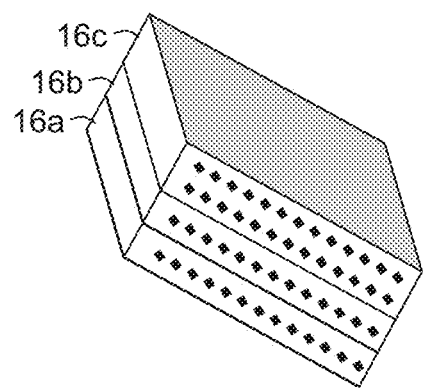

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of printing heads. Each head preferably comprises one or more arrays of nozzles 122, typically mounted on an orifice plate 121, as illustrated in FIGS. 2A-C described below, through which a liquid building material 124 is dispensed.

Preferably, but not obligatorily, apparatus 114 is a three-dimensional printing apparatus, in which case the printing heads are inkjet printing heads, and the building material is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material deposition apparatus.

Each printing head is optionally and preferably fed via one or more building material reservoirs which may optionally include a temperature control unit (e.g., a temperature sensor and/or a heating device), and a material level sensor. To dispense the building material, a voltage signal is applied to the printing heads to selectively deposit droplets of material via the printing head nozzles, for example, as in piezoelectric inkjet printing technology. Another example includes thermal inkjet printing heads. In these types of heads, there are heater elements in thermal contact with the building material, for heating the building material to form gas bubbles therein, upon activation of the heater elements by a voltage signal. The gas bubbles generate pressures in the building material, causing droplets of building material to be ejected through the nozzles. Piezoelectric and thermal printing heads are known to those skilled in the art of solid freeform fabrication. For any types of inkjet printing heads, the dispensing rate of the head depends on the number of nozzles, the type of nozzles and the applied voltage signal rate (frequency).

Preferably, but not obligatorily, the overall number of dispensing nozzles or nozzle arrays is selected such that half of the dispensing nozzles are designated to dispense support material and half of the dispensing nozzles are designated to dispense modeling material, i.e. the number of nozzles jetting modeling materials is the same as the number of nozzles jetting support material. In the representative example of FIG. 1A, four printing heads 16a, 16b, 16c and 16d are illustrated. Each of heads 16a, 16b, 16c and 16d has a nozzle array. In this Example, heads 16a and 16b can be designated for modeling material/s and heads 16c and 16d can be designated for support material. Thus, head 16a can dispense one modeling material, head 16b can dispense another modeling material and heads 16c and 16d can both dispense support material. In an alternative embodiment, heads 16c and 16d, for example, may be combined in a single head having two nozzle arrays for depositing support material. In a further alternative embodiment any one or more of the printing heads may have more than one nozzle arrays for depositing more than one material, e.g. two nozzle arrays for depositing two different modeling materials or a modeling material and a support material, each formulation via a different array or number of nozzles.

Yet it is to be understood that it is not intended to limit the scope of the present invention and that the number of modeling material printing heads (modeling heads) and the number of support material printing heads (support heads) may differ. Generally, the number of arrays of nozzles that dispense modeling material, the number of arrays of nozzles that dispense support material, and the number of nozzles in each respective array are selected such as to provide a predetermined ratio, a, between the maximal dispensing rate of the support material and the maximal dispensing rate of modeling material. The value of the predetermined ratio, a, is preferably selected to ensure that in each formed layer, the height of modeling material equals the height of support material. Typical values for a are from about 0.6 to about 1.5.

As used herein throughout the term "about" refers to ±10%.

For example, for a=1, the overall dispensing rate of support material is generally the same as the overall dispensing rate of the modeling material when all the arrays of nozzles operate.

Apparatus 114 can comprise, for example, M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material level sensor of its own, and receives an individually controlled voltage for its operation.

Apparatus 114 can further comprise a solidifying device 324 which can include any device configured to emit light, heat or the like that may cause the deposited material to harden. For example, solidifying device 324 can comprise one or more radiation sources, which can be, for example, an ultraviolet or visible or infrared lamp, or other sources of electromagnetic radiation, or electron beam source, depending on the modeling material being used. In some embodiments of the present invention, solidifying device 324 serves for curing or solidifying the modeling material.

In addition to solidifying device 324, apparatus 114 optionally and preferably comprises an additional radiation source 328 for solvent evaporation. Radiation source 328 optionally and preferably generates infrared radiation. In various exemplary embodiments of the invention solidifying device 324 comprises a radiation source generating ultraviolet radiation, and radiation source 328 generates infrared radiation.

In some embodiments of the present invention apparatus 114 comprises cooling system 134 such as one or more fans or the like.

The printing head(s) and radiation source are preferably mounted in a frame or block 128. Preferably block 128 is mounted above a tray 360, which serves as the working surface, wherein at least one of block 128 and tray 360 is operative to reciprocally move so as to establish a relative reciprocal motion between tray 360 and block 128. In some embodiments of the present invention the radiation sources are mounted in the block such that they follow in the wake of the printing heads to at least partially cure or solidify the materials just dispensed by the printing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises a leveling system 32, which can comprise a roller and optionally and preferably also with a blade. Leveling system 32 serves to straighten, level and/or establish a thickness of the newly formed layer prior to the formation of the successive layer thereon. Leveling system 32 preferably comprises a waste collection device 136 for collecting the excess material generated during leveling. Waste collection device 136 may comprise a mechanism that delivers the material to a waste tank or waste cartridge, as further detailed hereinbelow.

In use, the printing heads of unit 16 move in a scanning direction, which is referred to herein as the X direction, and selectively dispense building material in a predetermined configuration in the course of their passage over tray 360. The building material typically comprises one or more types of support material and one or more types of modeling material. The passage of the printing heads of unit 16 is followed by the curing of the modeling material(s) by radiation source 126. In the reverse passage of the heads, back to their starting point for the layer just deposited, an additional dispensing of building material may be carried out, according to predetermined configuration. In the forward and/or reverse passages of the printing heads, the layer thus formed may be straightened by leveling system 32, which preferably follows the path of the printing heads in their forward and/or reverse movement. Once the printing heads return to their starting point along the X direction, they may move to another position along an indexing direction, referred to herein as the Y direction, and continue to build the same layer by reciprocal movement along the X direction. Alternately, the printing heads may move in the Y direction between forward and reverse movements or after more than one forward-reverse movement. The series of scans performed by the printing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the printing head of unit 16, within the layer. Such Z displacement is carried out in order to cause contact of the leveling device with the surface in one direction and prevent contact in the other direction.

System 110 optionally and preferably comprises a building material supply system 330 which comprises the building material containers or cartridges and supplies a plurality of building materials to fabrication apparatus 114.

A computerized controller 20 controls fabrication apparatus 114 and optionally and preferably also supply system 330. Controller 20 typically includes an electronic circuit configured to perform the controlling operations. Controller 20 preferably communicates with a data processor 24 which transmits digital data pertaining to fabrication instructions based on computer object data, e.g., a CAD configuration represented on a computer readable medium in a form of a Standard Tessellation Language (STL) format or the like. Typically, controller 20 controls the voltage applied to each printing head or each nozzle array and the temperature of the building material in the respective printing head or respective nozzle array.

Once the manufacturing data is loaded to controller 20 it can operate without user intervention. In some embodiments, controller 20 receives additional input from the operator, e.g., using data processor 24 or using a user interface 116 communicating with controller 20. User interface 116 can be of any type known in the art, such as, but not limited to, a keyboard, a touch screen and the like. For example, controller 20 can receive, as additional input, one or more building material types and/or attributes, such as, but not limited to, color, characteristic distortion and/or transition temperature, viscosity, electrical property, magnetic property. Other attributes and groups of attributes are also contemplated.

Figure 1B:
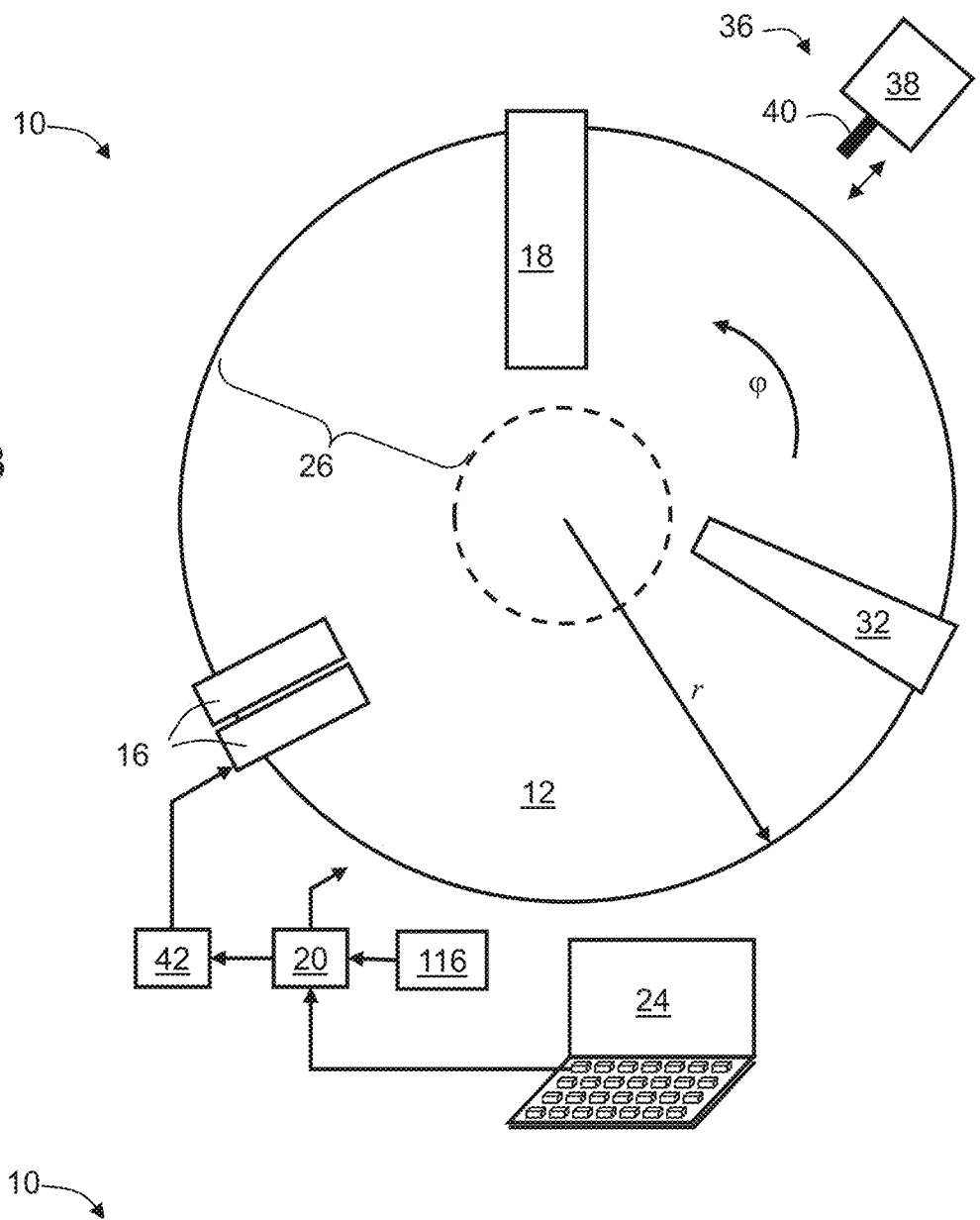
Figure 1C:
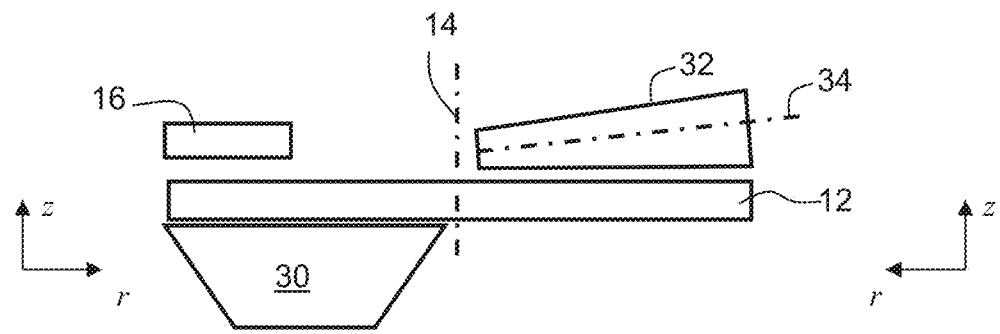
Figure 1D:
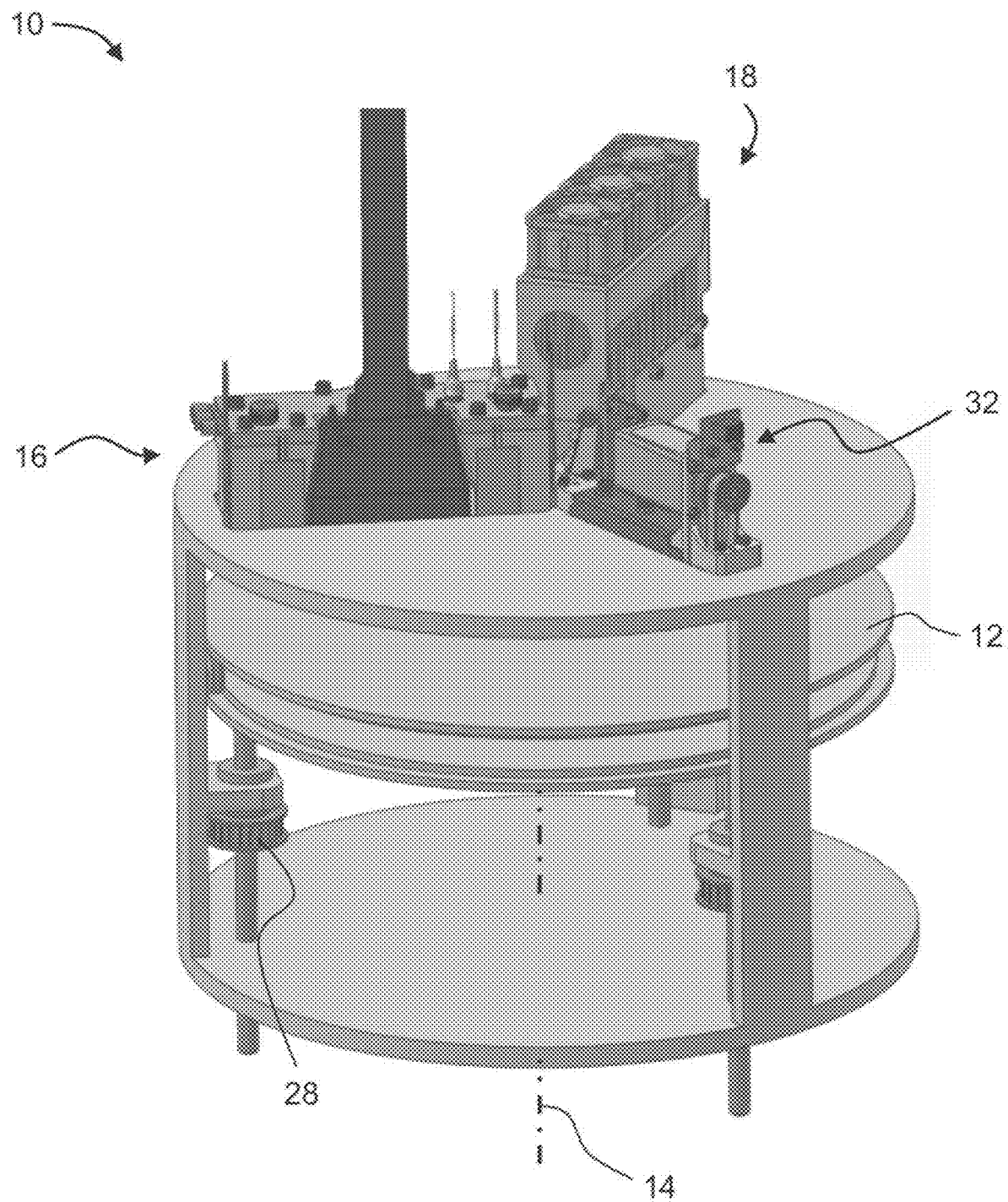

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having one or more arrays of nozzles with respective one or more pluralities of separated nozzles. The material used for the three-dimensional printing is supplied to heads 16 by a building material supply system 42. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While some embodiments of system 10 are described below with a particular emphasis to configuration (i) wherein the tray is a rotary tray that is configured to rotate about vertical axis 14 relative to heads 16, it is to be understood that the present application contemplates also configurations (ii) and (iii) for system 10. Any one of the embodiments of system 10 described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction $\varphi$, and a direction perpendicular to tray 12 is referred to herein is the vertical direction z.

The radial direction r in system 10 enacts the indexing direction y in system 110, and the azimuthal direction $\varphi$ enacts the scanning direction x in system 110. Therefore, the radial direction is interchangeably referred to herein as the indexing direction, and the azimuthal direction is interchangeably referred to herein as the scanning direction.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a building platform for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other. When a printing head has two or more arrays of nozzles (e.g., FIG. 2B) all arrays of the head can be fed with the same building material, or at least two arrays of the same head can be fed with different building materials.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1$-$\varphi_2$, and the angle between the linear nozzle arrays of the two heads is also $\varphi_1$-$\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a stabilizing structure 30 positioned below heads 16 such that tray 12 is between stabilizing structure 30 and heads 16. Stabilizing structure 30 may serve for preventing or reducing vibrations of tray 12 that may occur while inkjet printing heads 16 operate. In configurations in which printing heads 16 rotate about axis 14, stabilizing structure 30 preferably also rotates such that stabilizing structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, stabilizing structure 30 preferably also moves vertically together with tray 12. In configurations in which the vertical distance is varied by heads 16 along the vertical direction, while maintaining the vertical position of tray 12 fixed, stabilizing structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a computerized controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20. Controller 20 can also communicate with user interface 116, as further detailed hereinabove.

Figure 3A:
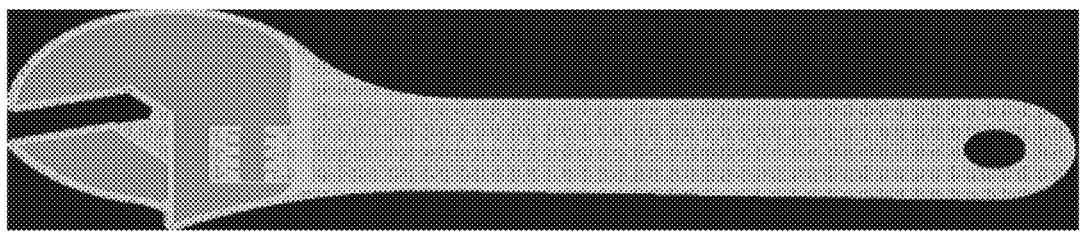
FIGS. 3A and 3B are schematic illustrations demonstrating coordinate transformations according to some embodiments of the present invention.
Figure 3B:
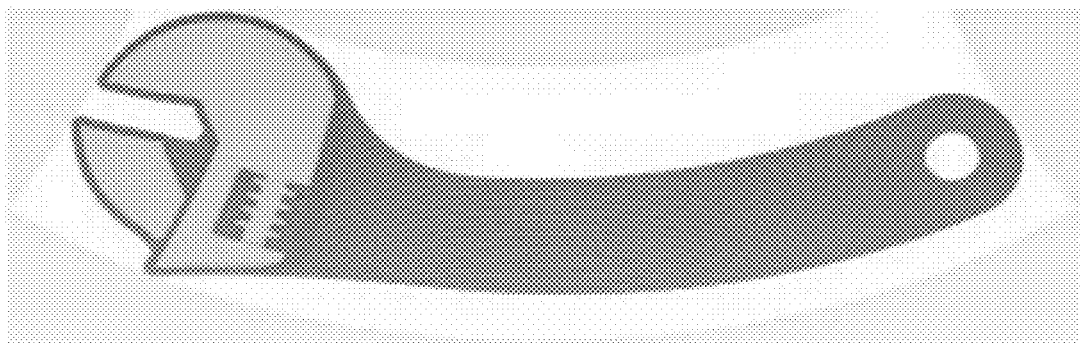

The transformation of coordinates allows three-dimensional printing over a rotating tray. In non-rotary systems with a stationary tray with the printing heads typically reciprocally move above the stationary tray along straight lines. In such systems, the printing resolution is the same at any point over the tray, provided the dispensing rates of the heads are uniform. In system 10, unlike non-rotary systems, not all the nozzles of the head points cover the same distance over tray 12 during at the same time. The transformation of coordinates is optionally and preferably executed so as to ensure equal amounts of excess material at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling material being used. Radiation source can include any type of radiation emitting device, including, without limitation, light emitting diode (LED), digital light processing (DLP) system, resistive lamp and the like. Radiation source 18 serves for curing or solidifying the modeling material. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises leveling system 32 which can comprise a roller optionally and preferably with a blade and optionally also with a waste collection device (not shown, see FIG. 1A), as further detailed hereinbelow. Leveling system 32 serves to straighten the newly formed layer prior to the formation of the successive layer thereon.

In some optional embodiments, leveling system 32 has the shape of a conical roller positioned such that its symmetry axis 34 is tilted relative to the surface of tray 12 and its surface is parallel to the surface of the tray. This embodiment is illustrated in the side view of system 10 (FIG. 1C). The conical roller can have the shape of a cone or a conical frustum.

The operation of leveling system 32 is optionally and preferably controlled by controller 20 which may activate and deactivate leveling system 32. In some optional embodiments, controller 20 controls the position leveling system 32 is along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different materials from different arrays of nozzles (belonging to the same or different printing head). These embodiments provide, inter alia, the ability to select materials from a given number of materials and define desired combinations of the selected materials and their properties. According to the present embodiments, the spatial locations of the deposition of each material with the layer is defined, either to effect occupation of different three-dimensional spatial locations by different materials, or to effect occupation of substantially the same three-dimensional location or adjacent three-dimensional locations by two or more different materials so as to allow post deposition spatial combination of the materials within the layer, thereby to form a composite material at the respective location or locations.

Any post deposition combination or mix of modeling materials is contemplated. For example, once a certain material is dispensed it may preserve its original properties. However, when it is dispensed simultaneously with another modeling material or other dispensed materials which are dispensed at the same or nearby locations, a composite material having a different property or properties to the dispensed materials may be formed.

In some embodiments of the present invention the system dispenses digital material for at least one of the layers.

The phrase "digital materials", as used herein and in the art, describes a combination of two or more materials on a pixel level or voxel level such that pixels or voxels of different materials are interlaced with one another over a region. Such digital materials may exhibit new properties that are affected by the selection of types of materials and/or the ratio and relative spatial distribution of two or more materials.

As used herein, a "voxel" of a layer refers to a physical three-dimensional elementary volume within the layer that corresponds to a single pixel of a bitmap describing the layer. The size of a voxel is approximately the size of a region that is formed by a building material, once the building material is dispensed at a location corresponding to the respective pixel, leveled, and solidified.

The present embodiments thus enable the deposition of a broad range of material combinations, and the fabrication of an object which may consist of multiple different combinations of materials, in different parts of the object, according to the properties desired to characterize each part of the object.

Further details on the principles and operations of an AM system suitable for the present embodiments are found in U.S. Published Application No. 20100191360, the contents of which are hereby incorporated by reference.

The present embodiments comprise a service station system that can be a sub-system in a three-dimensional printing system, such as, but not limited to, system 10 or 110. The service station system can serve for automatically performing service operations, including, without limitation, wiping a dispensing surface of a printing head (e.g., orifice plate 121), and collecting liquid building material wiped off, or purged by, the dispensing surface of the printing head. During a printing of a three-dimensional object, the controller of the three-dimensional printing system (e.g., controller 20) typically controls the printing head(s) of the printing system to periodically visit the service station system of the present embodiments for wiping of the dispensing face and/or purging building material. Typically, controller 20 moves the printing head to the location of the service station system every N dispensed layers, where N can be a predetermined number, e.g., from about 10 to about 50.

Figure 4A:
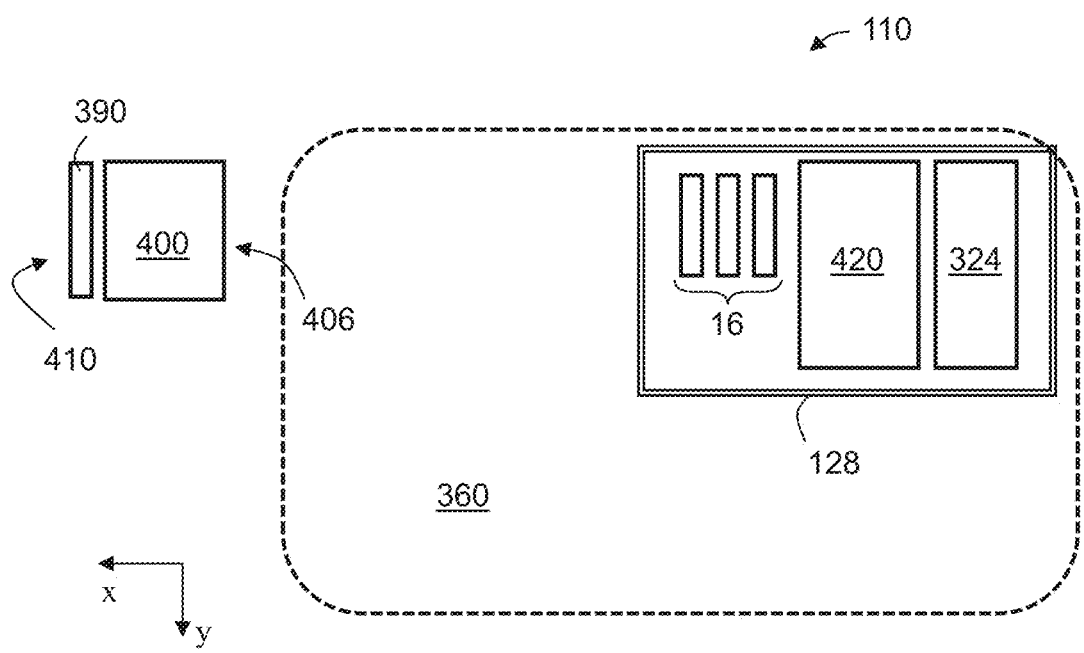
FIGS. 4A and 4B are schematic illustrations showing top views of three-dimensional printing systems that comprise a service station system according to some embodiments of the present invention.
Figure 4B:
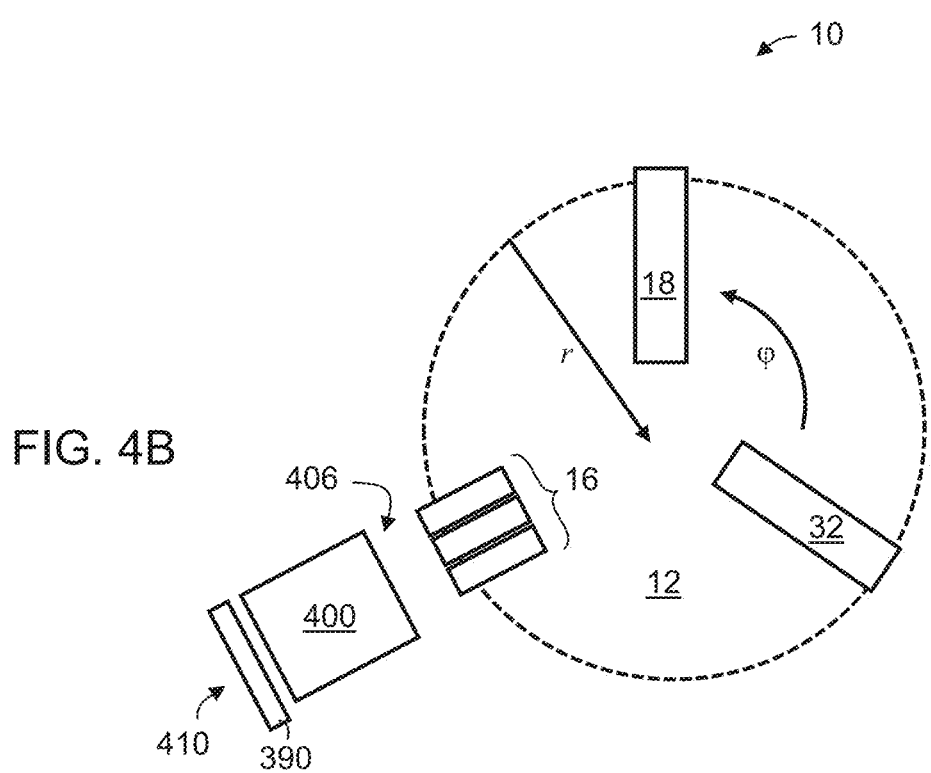

FIGS. 4A and 4B are schematic illustrations showing top views of three-dimensional printing systems that comprise a service station system 400 according to some embodiments of the present invention. A more detailed description of service station system 400 is provided below with reference to FIGS. 5A-6D. Generally, service station system 400 can be used in any three-dimensional printing system that includes one or more printing heads having a dispensing face, e.g., an orifice plate having an array of nozzles. In the exemplified illustration of FIG. 4A, service station system 400 is a sub-system of printing system 110, and in the exemplified illustration of FIG. 4B, service station system 400 is a sub-system of printing system 10.

In some embodiments of the present invention the three-dimensional printing system employing service station system 400 also comprises a backlight source 390, positioned at a back side 410 of service station system 400. Preferably, the operation of backlight source 390 is controlled by the controller of the printing system (e.g., controller 20). Backlight source 390 optionally and preferably provides light at the visible range (e.g., at a wavelength of from about 400 nm to about 700 nm). The light can be monochromatic or polychromatic and can be generated according to any physical principle. Preferably, the light generated by source 390 does not cure the building material used by the printing system. For example, when the building material is UV-curable, the light generated by source 390 does not include spectral components in the ultraviolet range. Representative examples of light source types that can be used as backlight source 390 include, without limitation, a light emitting diode (LED) packaged or un-packaged die, a laser diode (LD), a vertical-cavity surface-emitting laser (VCSEL) packaged or un-packaged die, an organic LED (OLED) packaged or un-packaged die, a quantum dot (QD) lamp, and the like. Backlight source 390 can be used for alignment as will be further explained hereinunder.

Figure 5A:
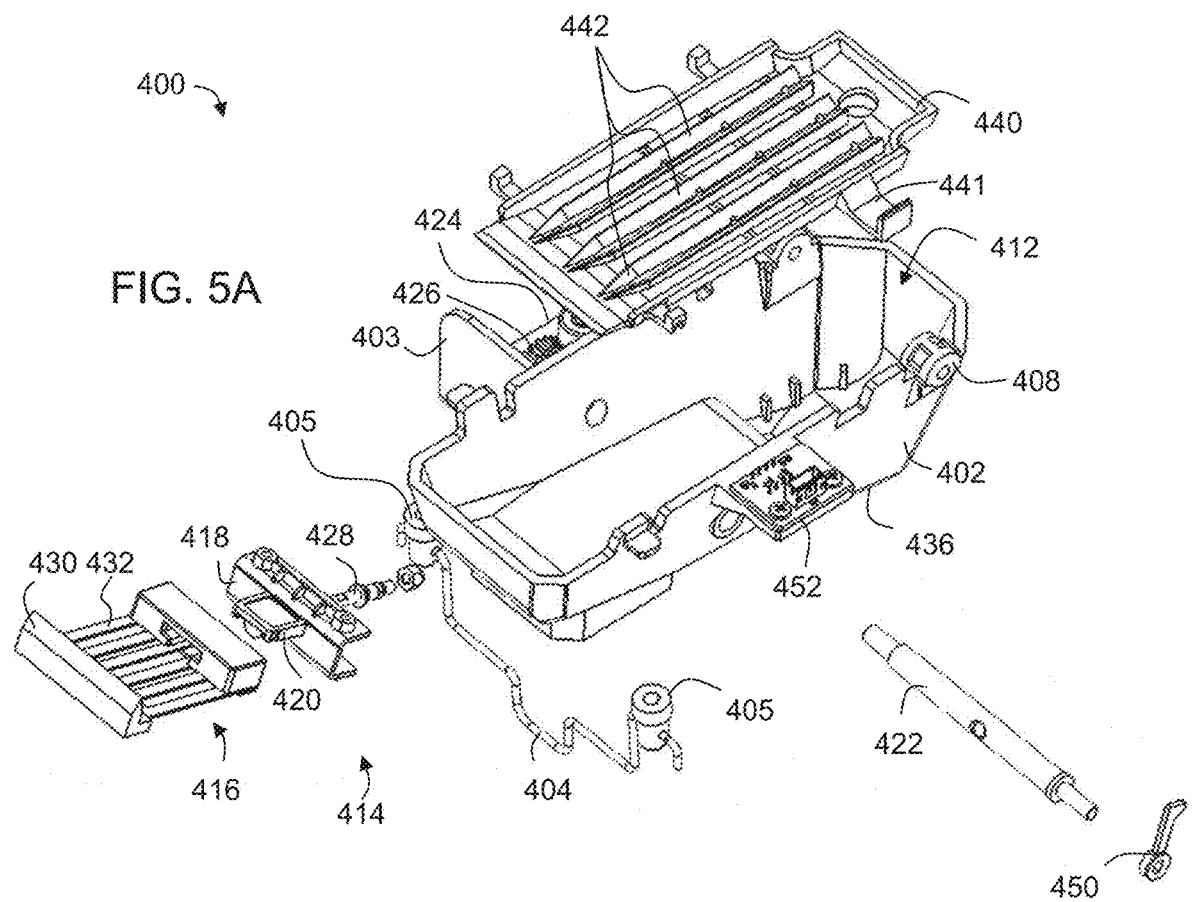
FIGS. 5A-H are schematic illustrations, showing several views of a service station system according to some embodiments of the present invention.
Figure 5B:
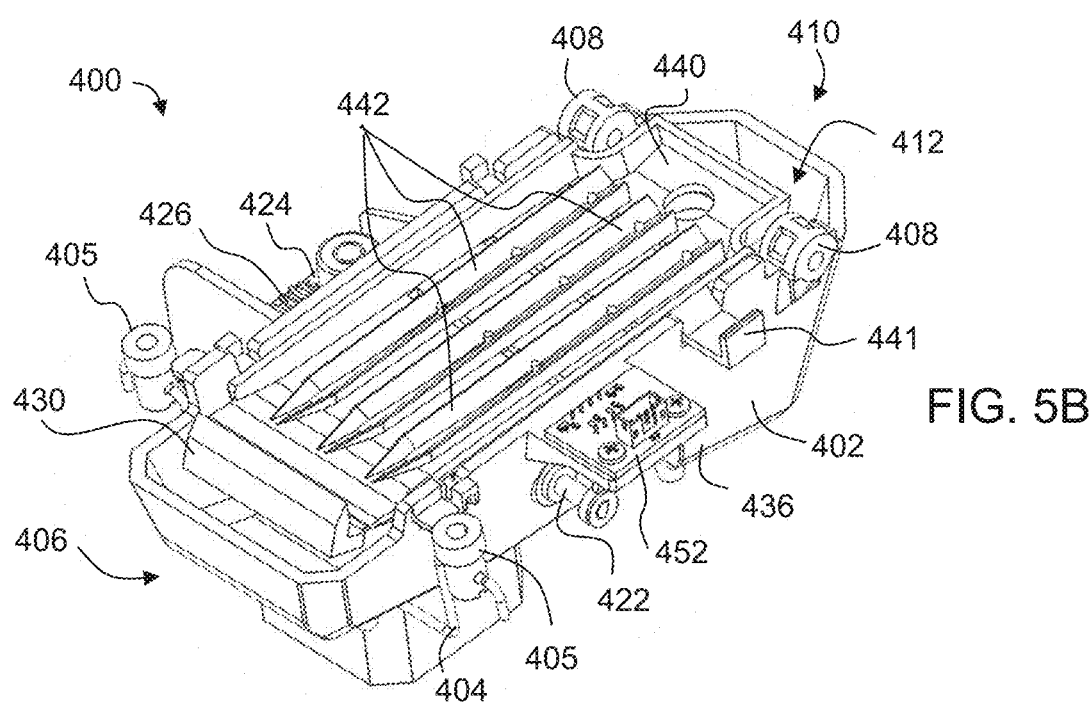
Figure 5C:
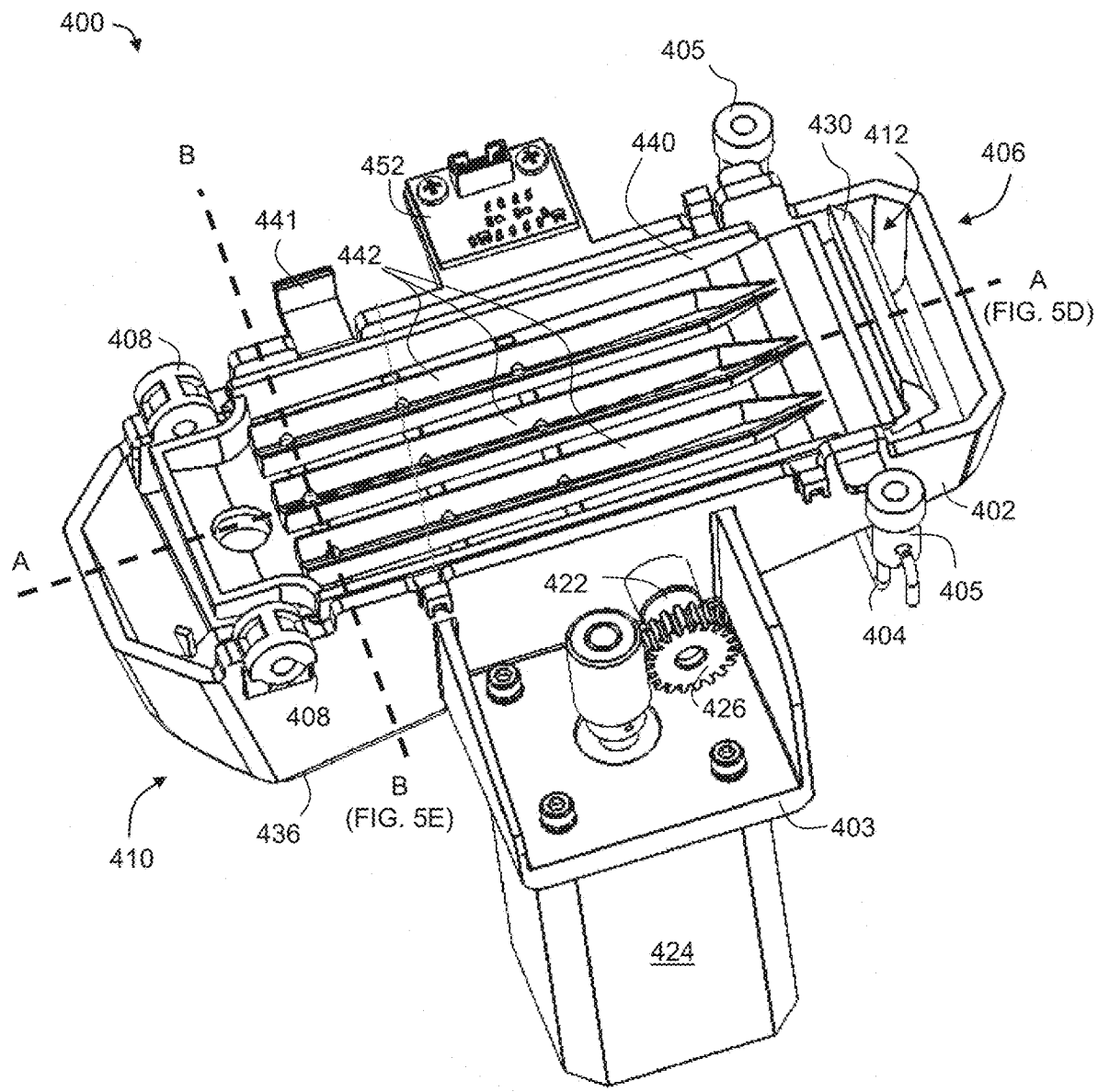
Figure 5D:
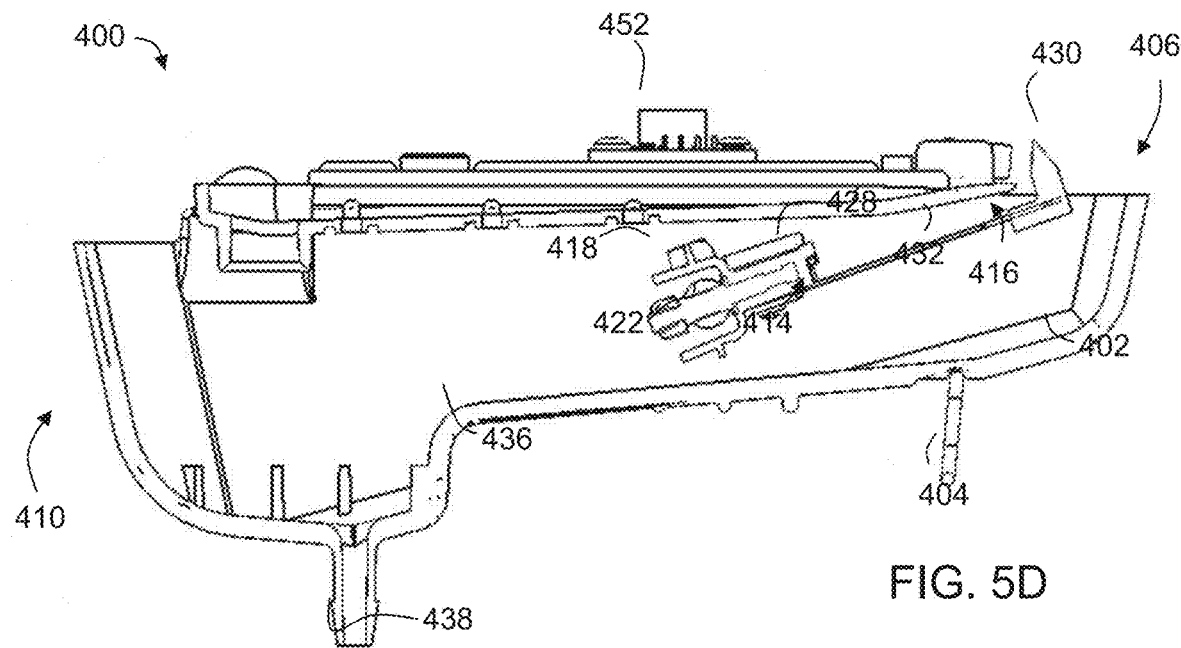
Figure 5E:
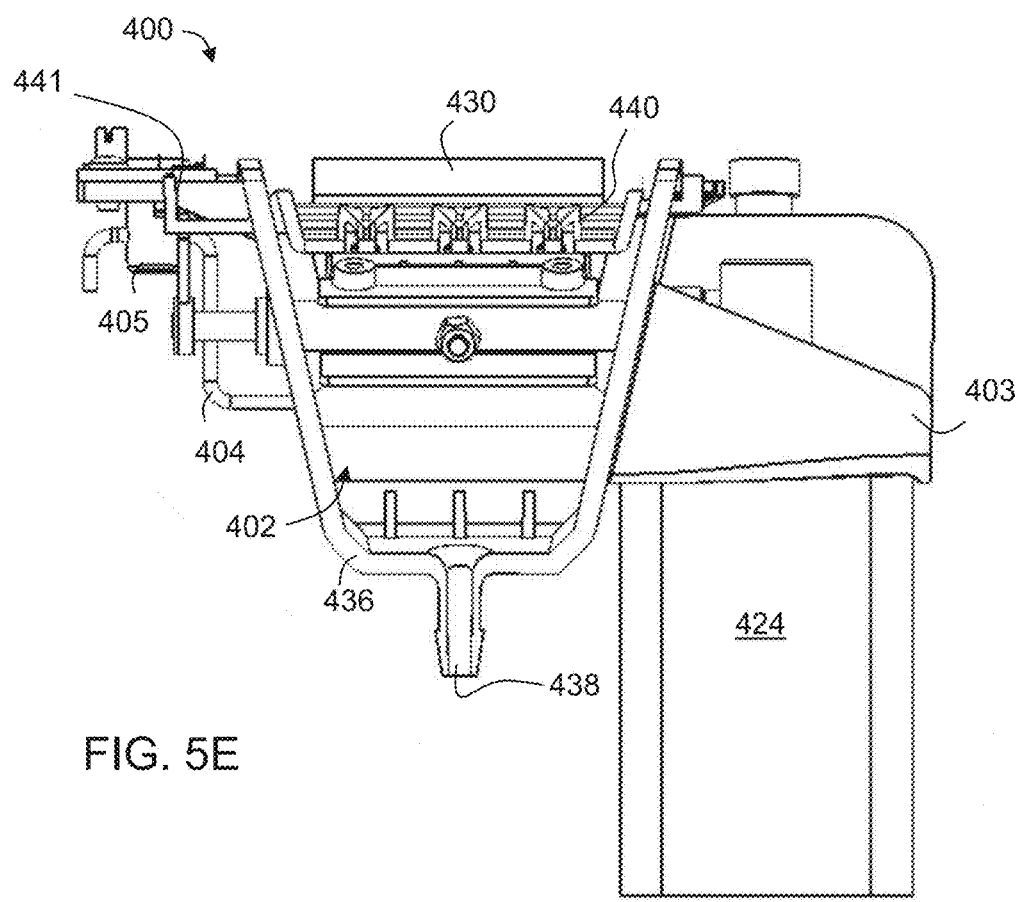
Figure 5F:
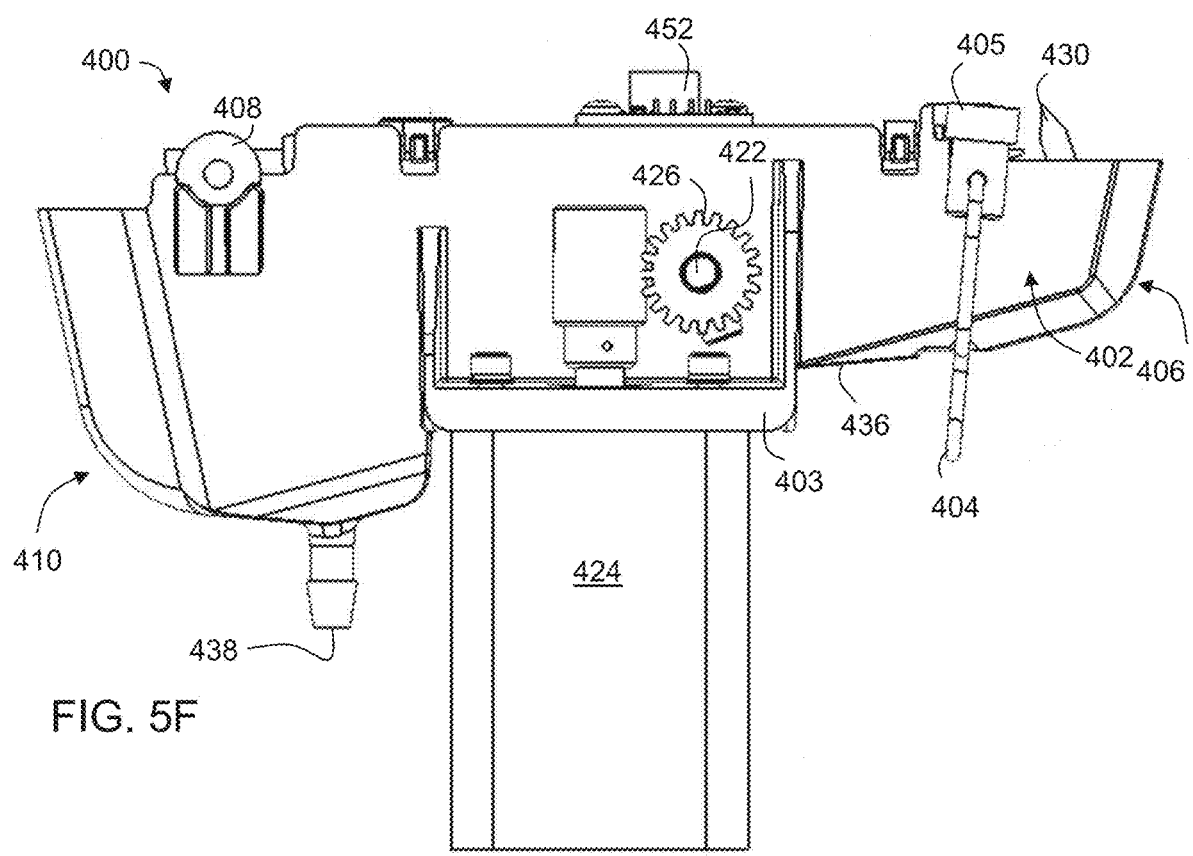
Figure 5G:
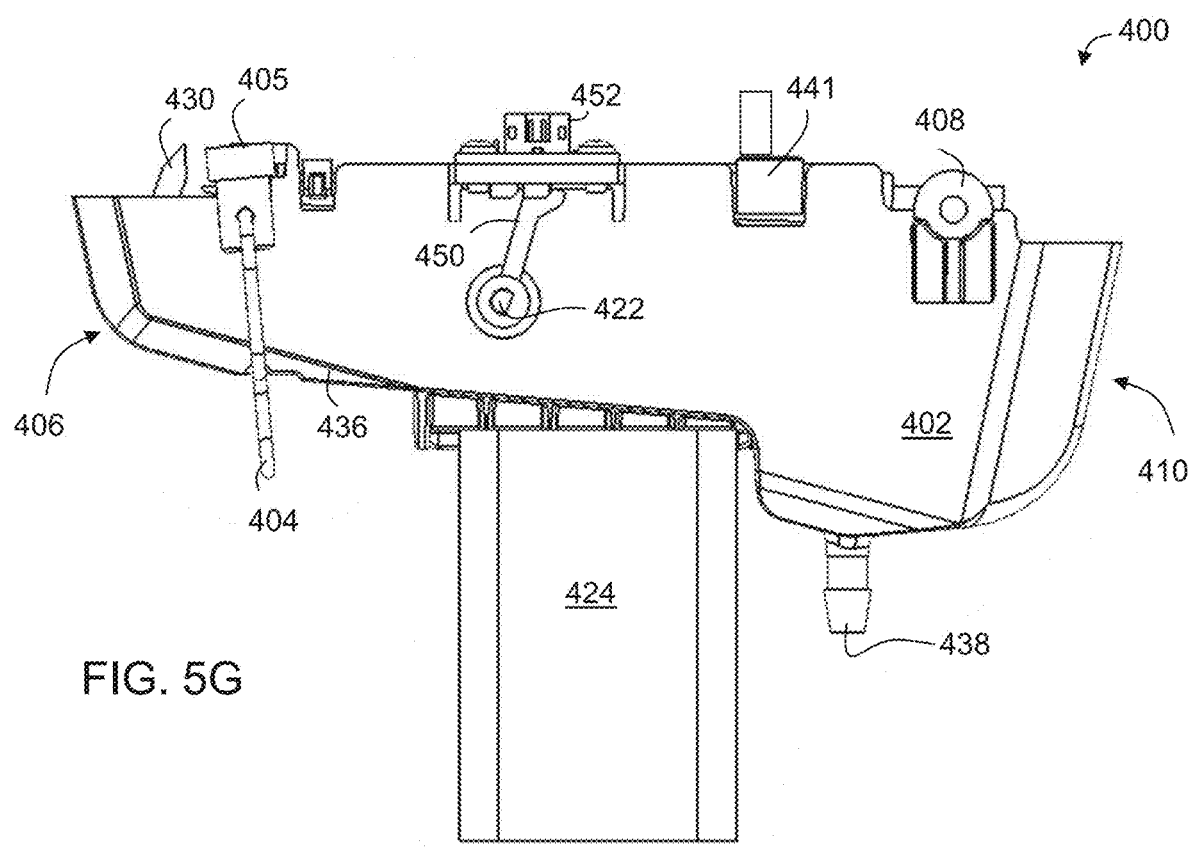

FIGS. 5A-H are schematic illustrations, showing an exploded view (FIG. 5A), a top-right perspective view (FIG. 5B), a top-left perspective view (FIG. 5C), cross-sectional views (FIGS. 5D and 5E) respectively along lines A - - - A and B - - - B of FIG. 5C, left and right side views (FIGS. 5F and 5G, respectively), and a top view (FIG. 5H) of service station system 400 according to some embodiments of the present invention.

Service station system 400 comprises a bath 402, having an open top 412 and a bottom 436, which is optionally and preferably slanted and provided with an outlet port 438 (best seen in FIGS. 5D-G). Preferably, but not necessarily, bath 402 has a fast-release connector 404 at a front side 406 thereof, and a hinge 408 at a back side 410 thereof. Hinge 408 serves for connecting an open top 412 of bath 402 to a mounting plate 500 of the three-dimensional printing system (see FIG. 5H), and connector 404 serves for supporting bath 402 such that the top 412 of bath 402 is generally horizontal. In some embodiments, connector 404 is fixed by connector holders 405 on the same mounting plate 500 as hinge 408. The mounting plate 500 of the three-dimensional printing system on which bath 402 is mounted is optionally and preferably at the top part of the printing system, at a level that is immediately below the level of the dispensing face of the printing heads.

Fast-release connector 404 can comprise, for example, a latch assembly, or a snap-type connector as desired. When connector 404 is a latch assembly, it optionally and preferably comprises a bent elastic wire, such as, but not limited to, a bent metallic wire, shaped to support bath 402 from below, as illustrated in FIGS. 5A-D, and 5F-G. Bath 402 is rotatable about an axis defined by hinge 408. The advantage of connecting bath to the printing system by a hinge at one side and supporting it using a fast release connector at the other side is that it allows performing maintenance operation, as further detailed hereinbelow, without the need for removing bath 402 from the printing system.

Service station system 400 also comprises a wiper assembly 414, having a wiper device 416 configured to wipe a dispensing face of one or more printing heads (e.g., orifice plate 121 of heads 16) while the printing head reciprocally moves above bath 402 between back side 410 and front side 406.

Wiper device 416 can be oriented generally perpendicular to an indexing direction of the three-dimensional printing system. These embodiments are particularly useful when a rotary system is employed (e.g., system 10), in which case the head(s) move to the location of service station 400 along the radial direction (see FIG. 4B), so that wiper device 416, which is oriented generally along the azimuthal direction, wipes the dispensing surface on the head while the head enters the service station zone. In the embodiments in which device 416 is perpendicular to the indexing direction, the width of wiper device is optionally and preferably at least the width of all the printing heads of printing system. This allows the same wiper device 416 to wipe all the heads of the printing system.

Wiper device 416 can alternatively be oriented generally parallel to the indexing direction of the three-dimensional printing system. These embodiments are particularly useful when a linearly reciprocal system is employed (e.g., system 110), in which case the head(s) move to the location of service station 400 along the scanning direction (see FIG. 4A), so that wiper device 416, which is oriented generally along the indexing direction, wipes the dispensing surface on the head while the head enters the service station zone. In the embodiments in which device 416 is generally parallel to the indexing direction, the width of wiper device is optionally and preferably at least the length of the printing head. This allows the same wiper device 416 to wipe the entire nozzle array of the printing system.

Additional optional features of wiper assembly 414 will be described hereinunder with respect to FIGS. 6A-D.

Figure 5H:
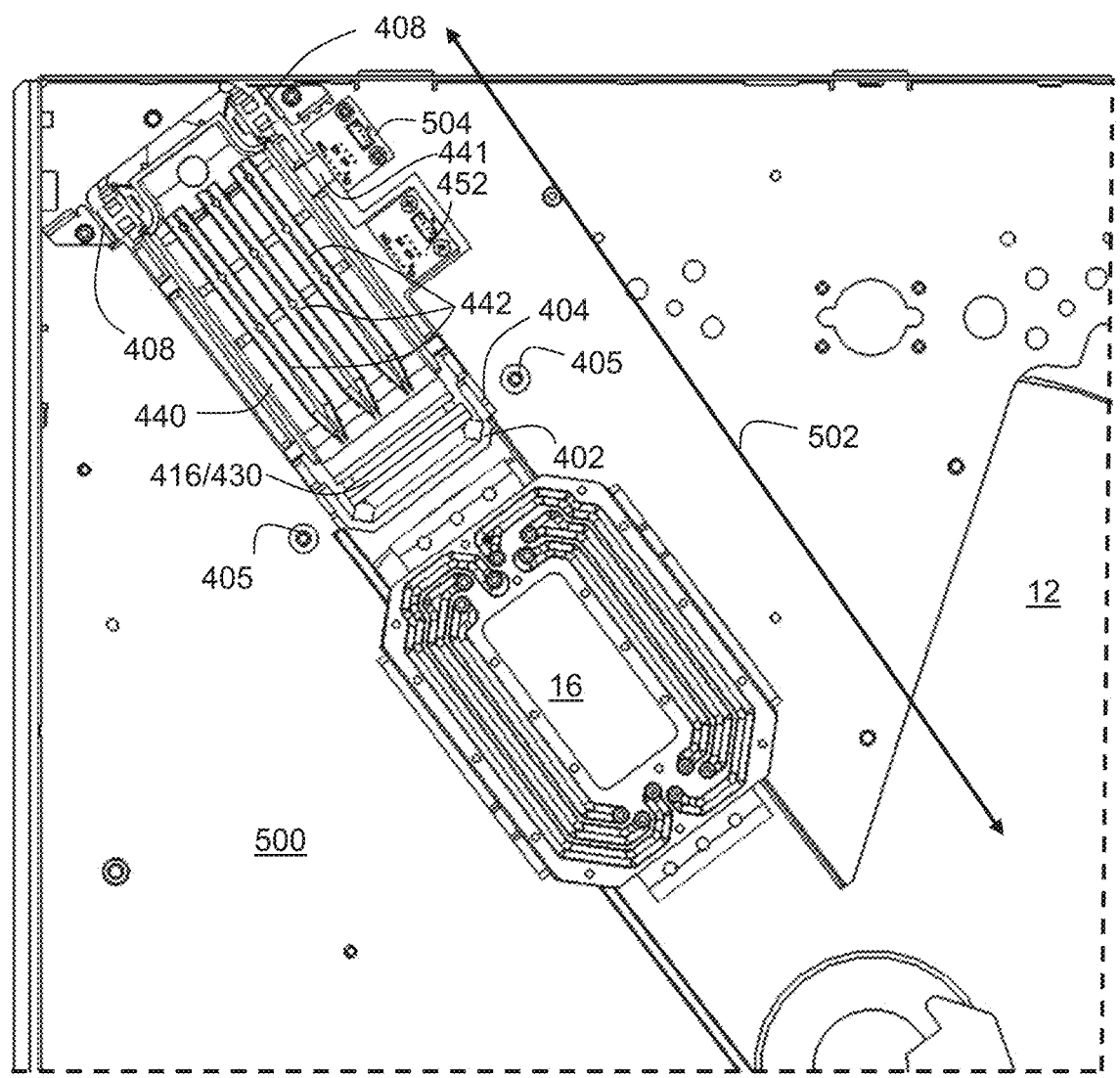

With reference to FIG. 5H, in use of service station system 400, the controller of the printing system moves the printing head along a direction 502 to the location of service station system 400, above bath 402. Direction 502 can be the indexing direction or the scanning direction. When the printing system is rotary, direction 502 is preferably the indexing direction, and when the printing system is a linearly reciprocal system, direction 502 is preferably the scanning direction.

During the motion of the head over bath 402, wiper device 416 engages the dispensing surface of the head to remove excess building material that may have been accumulated thereon. The excess material drips as liquid waste from wiper device 416 into bath 402. The liquid waste can be removed from bath 402 through outlet port 438, e.g., by means of a pump (not shown) or by gravity. While the printing head is above bath 402, the controller can also instruct the printing head to execute a purging procedure. For example, the purging procedure can be executed before changing the building material container that feeds the head, so as to remove the previous building material from the head's channel or other fluid paths in the system. In this case, bath 402 also collects the purged material, which can be thereafter evacuated via the outlet port 438.

In some embodiments of the present invention, service station system 400 also comprises a liquid trap 440 covering the top 412 of bath 402. Liquid trap 440 is preferably perforated. In these embodiments, the controller of the printing system moves the printing head to the location of service station system 400, above liquid trap 440, and the liquid waste drips from wiper device onto liquid trap 440, and then drips into bath 416 through the perforations of trap 440. Liquid trap 440 is also useful for the aforementioned purging procedure, in which case the head purges the building material onto trap 440, and the purged material then drips into bath 402 through the perforations of the liquid trap 440.

The advantage of liquid trap 440 is that it directs the dripping into the bath at locations that are set by the perforations. Other advantages are that it sets a barrier between the bulk amount of waste liquid in the bath and the printing head, and limit the exposure of waste liquid to light radiation (e.g. UV). Liquid trap 440 can comprise two or more perforated liquid guiding grooves 442 for collecting and guiding the liquid building material. The number of grooves 442 preferably equals the overall number of building material channels of the printing head(s) of the printing system. For example, liquid trap 440 can comprise one groove per linear array of nozzles. Preferably, grooves 442 are perforated at a plurality of locations along their length, except for locations at a vicinity of wiper assembly 414. This configuration protects various elements of wiper assembly 414 from being contaminated by liquid waste.

In some embodiments of the present invention an in-place sensor 504 is mounted on the mounting plate 500 of the printing system (see FIG. 5H). In-place sensor 504 can be of any type, including, without limitation, an electromechanical switch or an optical sensor. In-place sensor 504 can comprise, or be attached in proximity to, a slot (not shown) that is shaped and dimensioned to receive a protrusion 441 of liquid trap 440 (see FIGS. 5A-C), and is optionally and preferably configured for generating a signal indicative of a placement of protrusion 441 in the slot. The signal generated by sensor 504 is transmitted to the controller of the three-dimensional printing system (e.g., controller 20 of system 10 or 110). Responsively to a signal from sensor 504 that protrusion 441 is not in place, the controller can generate an alert that the service station system 400 is not properly mounted, and can also terminate the printing job (e.g., by deactivating all the nozzles in the array, and terminating the relative motion between the printing block and the tray).

Reference is now made to FIGS. 6A-D which are schematic illustrations describing wiper assembly 414 in greater detail. Some of the features described below also appear in one or more of FIGS. 5A-G. Throughout this specification, like numerals of reference indicate like features.

In some embodiments of the present invention, wiper assembly 414 comprises a wiper base 418, wherein wiper device 416 is detachably connected wiper base 418 by a dedicated connector 420. Connector 420 is optionally and preferably of the male-female fast release type, as illustrated in a disconnected state in FIG. 6A (see also FIG. 5A described above) and connected state in FIG. 6B. The advantage of these embodiments is that they allow easy replacement of wiper device 416, without the need to disassemble service station system 400 from the printing system.

Figure 6A:
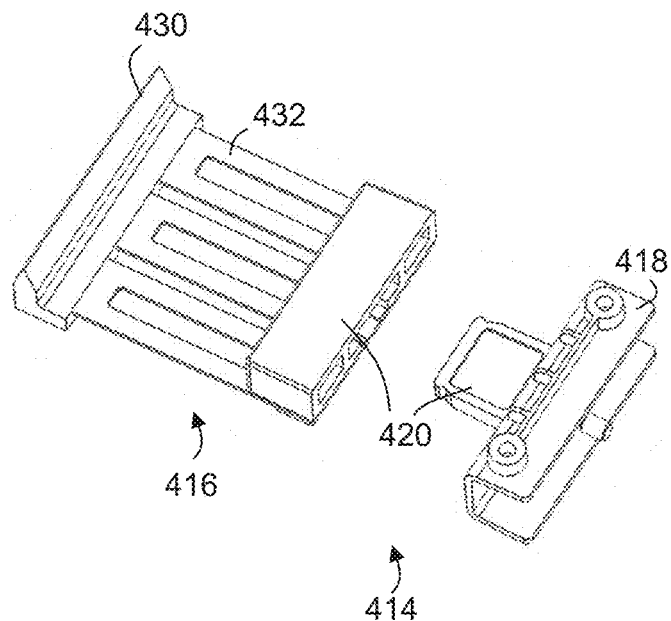
FIGS. 6A-D are schematic illustrations describing a wiper assembly according to some embodiments of the present invention.
Figure 6B:
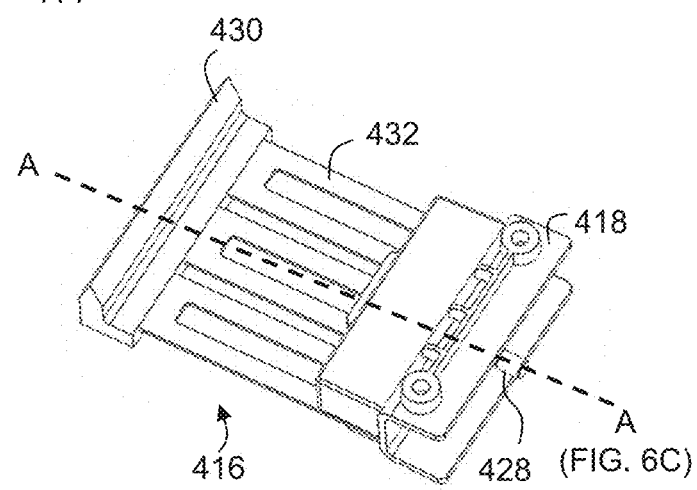
Figure 6C:
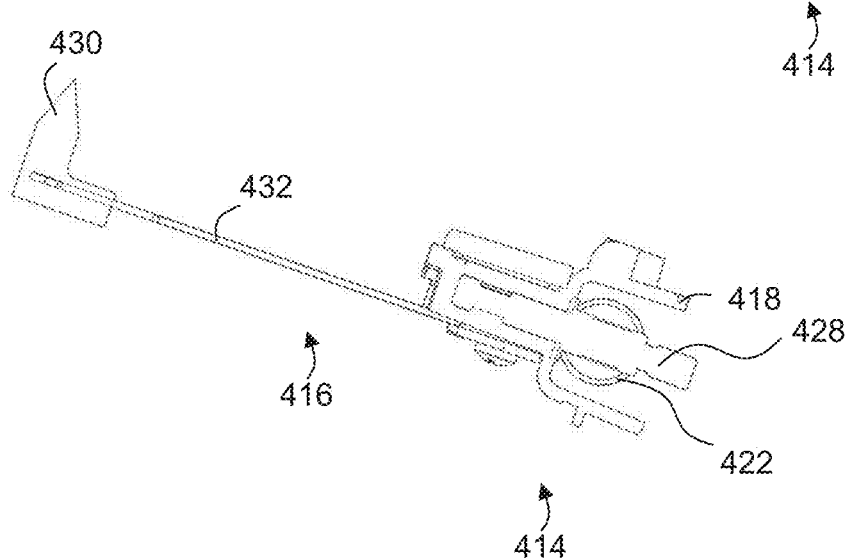
Figure 6D:
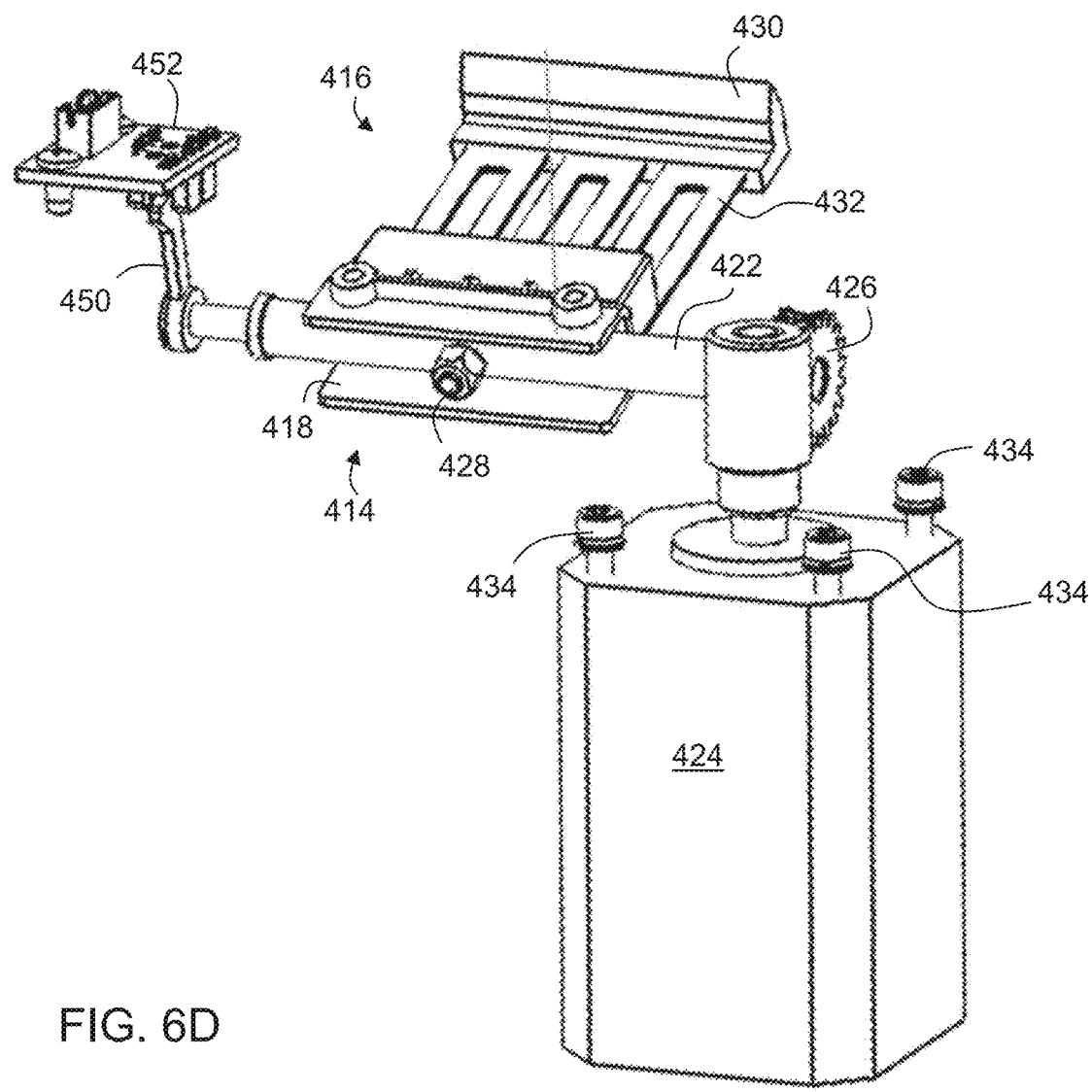

FIG. 6C is a cross-sectional view along the line A - - - A of FIG. 6B, except that it additionally illustrates an axis 422, on which wiper base 418 is mounted. Axis 422 is optionally and preferably a rotatable axis 422. Axis 422 is better seen in FIG. 6D, showing also a motor 424 for rotating axis 422. Motor 424 is preferably an electric motor, for example, a step-motor. Motor 424 can be controlled by the controller of the three-dimensional printing system (e.g., controller 20). A mechanical transmission 426 is provided between motor 424 and axis 422. In the illustrated embodiments, mechanical transmission 426 comprises a cogwheel, but other transmission types (e.g., belt, crawler, pulley) are also contemplated. Motor 424 is preferably mounted on a motor support structure 403 that can be connected to, or more preferably be a monolithic part of, bath 402 (see, for example, FIG. 5C). In some embodiments of the present invention motor 424 is mounted to structure 403 by three screws 434 at three of its corners, leaving the fourth corner unmounted.

Axis 422 passes through bath 402 (not shown in FIGS. 6A-D, see, e.g., FIGS. 5A and 5B), wherein transmission 426 and motor 424 are outside bath 402, while wiper base 418 and wiper device 416 are within bath 402, preferably at an upper part thereof.

In some embodiments of the present invention the wiper base 418 is mounted on axis 422 by a shaft 428 (see also FIG. 5A). In these embodiments, shaft 428 is rotatable, independently from, and perpendicularly to, the rotation of axis 422 by motor 424. The advantage of allowing shaft 428 to rotate perpendicularly to axis 422 is that it provides wiper device 416 by two rotational degrees of freedom thereby improving the ability to align wiper device 416 with the dispensing surface of the printing head, hence improving also the wiping efficiency. The advantage of allowing shaft 428 to rotate independently of axis 422 is that it provides the wiper device 416 with a self-aligning property. Specifically by slightly pressing wiper device 416 against the dispensing surface of the printing head, wiper device 416 becomes aligned with the dispensing surface via the independent rotation of shaft 428. Preferably, shaft 428 is tilted with respect to a horizontal direction, as illustrated in FIG. 6C (see also FIG. 5D). The tilt allows adjustment of the vertical position of wiper device 416 to engage the dispensing surface of the printing head by rotating axis 422, e.g. using motor 424.

In some embodiments of the present invention wiper base 418 is shaped as, or comprises, a shield structure for shielding a connection between shaft 428 and axis 422 from liquid building material wiped by wiper device or purged by the printing head. The inventors found that the shield structure reduces rotation failures of shaft 428 relative to axis 422.

Wiper device 416 typically comprises a wiping element 430 that engages the dispensing surface of the printing head during the wiping operation. Wiping element 430 preferably has wiping end that is substantially straight and continuous throughout its width, as illustrated in FIGS. 6A, 6B and 6D. Preferably, wiping element 430 is elastomeric. Suitable elastomers for wiping element 430 are elastomers characterized by a Shore A hardness of from about 70 to about 90.

Shore A Hardness, which is also referred to as Shore hardness or simply as hardness, describes a material's resistance to permanent indentation, defined by type A durometer scale. Shore hardness is typically determined according to ASTM D2240.

Representative types of elastomers suitable for the present embodiments including, without limitation, synthetic rubber, such as, but not limited to, ethylene propylene diene.

In some embodiments of the present invention the wiping element 430 (e.g., the elastomeric wiping element) is connected to an elastic non-polymeric planar structure 432, such as, but not limited to, a metallic planar structure. Structure 432 adds an additional degree of freedom to the aforementioned self-aligning property of wiper device 416 since the elastic forces may realign wiping element 430 with the dispensing surface of the head in case of a temporary misalignment, e.g., due to excessive accumulation of material on the head. Structure 432 also increases the lifetime of wiping element 430 since it maintains sufficient pressure of element 430 on the head even when element is about to become worn.

With reference to FIG. 6D, in some embodiments of the present invention, wiper assembly 414 comprises a flag member 450 mounted on axis 422 at an end opposite to mechanical transmission 426. In these embodiments, service station system 400 comprises a position sensor 452 mounted directly above axis 422 at the end on which flag member 450 is mounted. When flag member crosses the sensing element of position sensor 452, the sensor 452 transmits a signal to the controller of the printing system (e.g., controller 20), which signal can be used by the controller as an indication pertaining to the angle assumed by axis 422, hence also pertaining to the vertical position of wiper device 416 mounted thereon. For example, flag member 450 can be mounted on axis 422 such that when flag member 450 is in its uppermost position, the wiper is in its lower position within bath 402. During the adjustment of the vertical position of wiper device 416 by motor 424 the flag member 450 rotates downward. Thus, in this case, a signal from sensor 452 indicates that an adjustment procedure is to be performed, and the controller can issue an alert or otherwise terminate the printing job responsively to such a signal.

Figure 7:
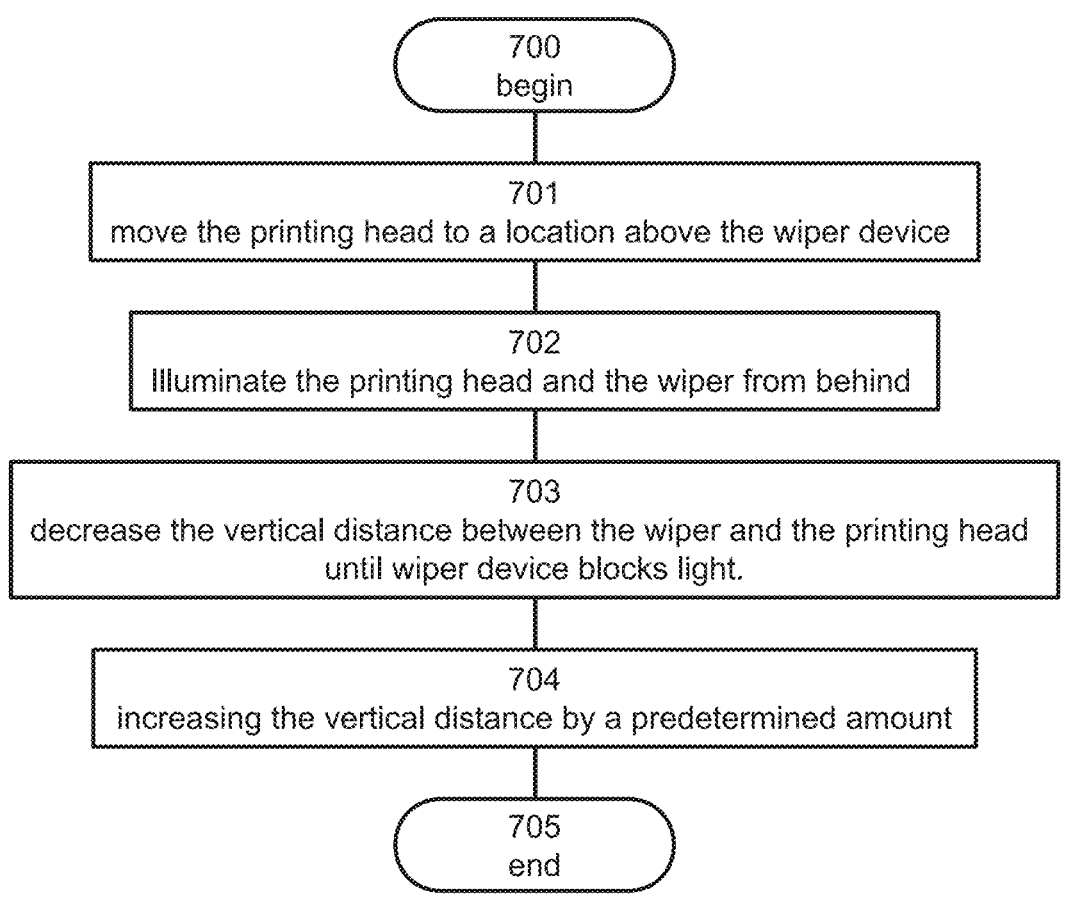
FIG. 7 is a flowchart diagram describing a method suitable for aligning a wiper device of a three-dimensional printing system, according to some embodiments of the present invention.

Reference is now made to FIG. 7 which is a flowchart diagram describing a method suitable for aligning a wiper device of a three-dimensional printing system, according to some embodiments of the present invention. The method can be executed, for example, using service station system 400 and any of three-dimensional printing systems 10 and 110.

It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method begins at 700 and continues to 701 at which the printing head of the printing system is moved to a location above the wiper device (e.g., wiper device 416) of the service station system. At 702 the printing head and the wiper device are illuminated from behind, by a backlight source (e.g., backlight source 390, see FIGS. 4A and 4B), such that light from the backlight source passes between the head and the wiper device.

At 703 the vertical distance between the wiper device and the printing head is decreased. This can be done by activating the motor of the service station system (e.g., motor 424). Operation 703 can be initiated before operation 702. For example, in some embodiments of the invention, the controller automatically activates the backlight source when motor rotates the axis of the service station system. Operation 703 preferably continues until wiper device blocks the light from the backlight source so that the light from the backlight source is non-visible by the user when looking at service station system 400 from front side 406. Once the light from the backlight source is blocked, the method determines that the wiper device engages the dispensing surface of the head, and the distance decrement can be terminated.

In some embodiments of the present invention, the method proceeds to 704 at which the vertical distance is increased by a predetermined amount so as to reduce a stress applied by the printing head on the wiping element of the wiper device. The predetermined amount is typically less than 1 mm or less than 0.5 mm.

The method ends at 705.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A service station system for a three-dimensional printing system having at least one printing head, comprising:
    a bath, having a fast-release connector at a front side thereof, and a hinge at a back side thereof for hingebly connecting an open top of said bath to a surface of the three-dimensional printing system;
    a wiper assembly, having a wiper device detachably connected to a wiper base mounted on a rotatable axis passing through said bath, said wiper device being configured to wipe a dispensing face of the printing head while said head reciprocally moves above said bath between said back side and said front side; and
    a motor for rotating said axis.

2. The system according to claim 1, wherein said wiper assembly comprises a shaft, wherein said wiper base is mounted on said rotatable axis by said shaft, and wherein said shaft is rotatable, independently from, and perpendicularly to, a rotation of said axis by said motor.

3. The system according to claim 2, wherein said shaft is tilted with respect to a horizontal direction.

4. The system according to claim 2, wherein said wiper assembly comprises a shield structure for shielding a connection between said shaft and said axis from liquid building material wiped by said wiper device or purged by the printing head.

5. The system according to claim 1, further comprising a liquid trap covering said top and having a plurality of perforated liquid guiding grooves for collecting liquid building material wiped by said wiper device or purged by the printing head.

6. The system according to claim 5, wherein said grooves are perforated at a plurality of locations along their length, except for locations at a vicinity of said wiper assembly.

7. The system according to claim 1, wherein said wiper device is oriented generally perpendicular to an indexing direction of said three-dimensional printing system.

8. The system according to claim 1, wherein said wiper device is oriented parallel to an indexing direction of said three-dimensional printing system.

9. The system according to claim 1, wherein said wiper device comprises an elastomeric wiping element having wiping end that is substantially straight and continuous throughout its width.

10. The system according to claim 1, wherein said wiper device comprises an elastomeric wiping element characterized by a Shore A hardness of from about 70 to about 90.

11. The system according to claim 10, wherein said elastomeric wiping element comprises a synthetic rubber.

12. The system according to claim 11, wherein said synthetic rubber comprises ethylene propylene diene.

13. The system according to claim 1, wherein said wiper device comprises an elastomeric wiping element connected to an elastic non-polymeric planar structure.

14. The system according to claim 1, wherein said fast-release connector comprises a latch assembly.

15. A system for three-dimensional printing, comprising:
    at least one printing head for dispensing building materials; and
    the service station system according to claim 1.

16. The system according to claim 15, further comprising a computerized controller configured for controlling said at least one printing head to periodically visit said service station system, for wiping of said dispensing face and/or purging building material into said bath.

17. A service station system for a three-dimensional printing system having at least one printing head, comprising:
    a bath, having a front side, a back side and an open top face;
    a wiper assembly, having a wiper device configured to wipe a dispensing face of the printing head while said head reciprocally moves above said bath between said back side and said front side; and
    a liquid trap covering said top and having a plurality of perforated liquid guiding grooves for collecting liquid building material wiped by said wiper device or purged by the printing head.

18. A method of printing a three-dimensional object, comprising:
    receiving three-dimensional printing data corresponding to the shape of the object;
    feeding said data to the three-dimensional printing system of claim 15; and
    periodically moving said at least one printing head to visit said service station system, for wiping of said dispensing face and/or purging building material into said bath.

19. A method of performing maintenance on a three-dimensional printing system, the three-dimensional printing system comprises the service station system according to claim 1, the method comprising:
    releasing said fast-release connector so as to hingebly rotate said front side of said bath downward, and reveal said wiper base;
    detaching said wiper device from said wiper base; and
    detachably connecting a replacement wiper device to said wiper base.

* * * * *